US006820158B1

(12) United States Patent
Lee et al.

(10) Patent No.: US 6,820,158 B1
(45) Date of Patent: Nov. 16, 2004

(54) METHOD AND APPARATUS FOR A CONFIGURATION RING

(75) Inventors: David M. Lee, Portland, OR (US); Kyle T. McCanta, Beaverton, OR (US); Eric R. Wehage, Tenino, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,978

(22) Filed: Aug. 30, 1999

(51) Int. Cl.[7] .......................... G06F 13/14; H04L 12/28
(52) U.S. Cl. ...................... 710/305; 710/107; 370/258; 709/251
(58) Field of Search ............................... 370/258, 351, 370/355, 392; 340/2.1, 2.23, 2.24, 2.26; 709/251; 710/107, 110, 305, 309

(56) References Cited

U.S. PATENT DOCUMENTS

| | | | | |
|---|---|---|---|---|
| 4,697,268 A | * | 9/1987 | Desyllas et al. ............ 714/717 |
| 5,301,185 A | * | 4/1994 | Cherry ....................... 370/216 |
| 5,374,926 A | * | 12/1994 | Szczepanek ........... 340/825.52 |
| 5,829,016 A | * | 10/1998 | Sharma et al. .............. 711/111 |
| 5,841,989 A | * | 11/1998 | James et al. ................ 709/239 |
| 5,886,992 A | * | 3/1999 | Raatikainen et al. ....... 370/410 |
| 5,983,302 A | * | 11/1999 | Christiansen et al. ....... 710/113 |
| 6,047,002 A | * | 4/2000 | Hartmann et al. .......... 370/466 |
| 6,167,480 A | * | 12/2000 | Williams et al. ............ 710/260 |
| 6,202,082 B1 | * | 3/2001 | Tomizawa et al. .......... 709/201 |
| 6,266,336 B1 | * | 7/2001 | Siegel et al. ................ 370/405 |
| 6,275,885 B1 | * | 8/2001 | Chin et al. .................. 710/311 |
| 6,330,245 B1 | * | 12/2001 | Brewer et al. .............. 370/424 |
| 6,330,654 B1 | * | 12/2001 | LaBerge et al. ............ 711/207 |
| 6,363,439 B1 | * | 3/2002 | Battles et al. ................ 710/36 |
| 6,377,582 B1 | * | 4/2002 | Neiger ....................... 370/406 |
| 6,564,241 B1 | * | 5/2003 | Rosengard .................. 718/107 |

OTHER PUBLICATIONS

"PCI Local Bus Specification", Revision 2.2, Dec. 18, 1998.*

* cited by examiner

*Primary Examiner*—Sumati Lefkowitz
*Assistant Examiner*—Trisha Vu
(74) *Attorney, Agent, or Firm*—Blakely, Sokoloff, Taylor & Zafman LLP

(57) ABSTRACT

A method and apparatus for a configuration ring is described. The method and apparatus include a configuration ring including a master, a first target, and a second target, the master coupled to the first target through a ring, the first target coupled to the second target through the ring, and the second target coupled to the master through the ring. The method and apparatus also include a method of using the configuration ring including originating a packet, passing the packet, decoding the packet, and utilizing the packet. The method and apparatus also includes a system including a processor, and processor bus coupled to the processor, a data chip coupled to the processor bus, a address chip coupled to the processor bus and the data chip, the address chip having a configuration ring, the configuration ring having a master, a first target and a second target, the master coupled through a ring to the first target, the first target coupled through the ring to the second target, the second target coupled through the ring to the master.

21 Claims, 15 Drawing Sheets

METHOD AND APPARATUS FOR A CONFIGURATION RING

BACKGROUND OF THE INVENTION

1. Field of the Invention

The invention generally relates to design of integrated circuits and more specifically to designing functional blocks within integrated circuits and connecting functional blocks both within and between integrated circuits.

2. Description of the Related Art

Within integrated circuit designs, configuration registers are used for a variety of purposes, typically where a function may need to be altered either by software or by testing hardware and software. These configuration registers typically provide inputs to logic within the circuit, and the value of the configuration register thereby has a direct effect on performance of the integrated circuit. In some integrated circuit or chipset designs, the number of configuration registers grows so large that routing the signals for these registers becomes burdensome or problematic. The configuration registers are typically expected to be unchanging during most operations of the integrated circuit, so high speed read and write access is not necessarily the most important consideration in the design of the configuration bits.

FIG. 2A illustrates a common scheme for distributing configuration bits, wherein Configuration BLOCK (Functional Block) 240 utilizes groups of configuration lines 250 to distribute configuration bits to BLOCK 210, BLOCK 220, and BLOCK 230. Each of BLOCK 210, BLOCK 220, and BLOCK 230 implement functions on a single integrated circuit.

FIG. 2B illustrates one specific prior art scheme for configuration bits, wherein each of the bits is stored in a flip-flop or other storage circuit in the Configuration BLOCK 240, and a line from each storage circuit is connected to the destinations for that bit, wherever they may be. One will appreciate that a rat's nest of signal lines may quickly develop in the process of routing all of these signals, especially the signals with multiple endpoints. Further, static timing, power consumption and reliability all become more problematic as fanout increases for a node or as actual length of the signal wire increases.

FIG. 2C illustrates an alternative prior art scheme for configuration bits. In this scheme, each bit is stored in a storage circuit in the BLOCK which utilizes the value of the bit. However, this also necessitates some form of signal (illustrated here as Write Enable WE) to enable writing to each storage circuit at the appropriate time, and another signal (read enable, not shown) which enables reading the signal. Effectively, two levels of decoding come into play, one at the centralized configuration block and another at the local level which ensures that the proper signals get to the proper registers to either read or write as appropriate. This extra level of overhead in the circuit design can create severe negative impacts on the overall integrated circuit.

Additionally, bi-directional signals or busses come into play. A bi-directional bus introduces problems of reliability and testability. To insure reliability, the circuit must be designed to carefully avoid contention on the bi-directional signal line, and also requires safeguards against a floating or unconnected signal line inducing a false signal in a circuit coupled to the bi-directional signal line. Furthermore, testability of bi-directional lines is problematic as typical ATPG (Automated Test Program Generation) regimes require that no contention or floating of the bi-directional signal line occur in the test vectors.

SUMMARY OF THE INVENTION

A method and apparatus for a Configuration Ring is described. The method and apparatus include a method of communicating between functional blocks including originating a packet, passing the packet, decoding the packet, and utilizing the packet. The method and apparatus further include a communications network including a first master having a ring interface and a control, a first target having a ring interface and a control, a first ring connection coupling the ring interface of the first master to the ring interface of the first target, a second target having a ring interface and a control, the first ring connection for passing packets, and a second ring connection coupling the ring interface of the first target to the ring interface of the second target, the second ring connection for passing packets, and a third ring connection coupling the ring interface of the second target to the ring interface of the first master, the third ring connection for passing packets.

Additionally, the method and apparatus include a communications network including a first master, a first target, a second target, and a ring, the ring coupled to the first master, the ring coupled to the first target, and the ring coupled to the second target. Moreover, the method and apparatus include a system including a processor, a processor bus coupled to the processor, a data chip coupled to the processor bus, and an address chip coupled to the processor bus and coupled to the data chip, the address chip including a configuration ring, the configuration ring having a master, a first target and a second target, the master coupled through a ring to the first target, the first target coupled through the ring to the second target, the second target coupled through the ring to the master.

BRIEF DESCRIPTION OF THE DRAWINGS

The present invention is illustrated by way of example and not limitation in the accompanying figures.

DETAILED DESCRIPTION

A method and apparatus for a Configuration Ring is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
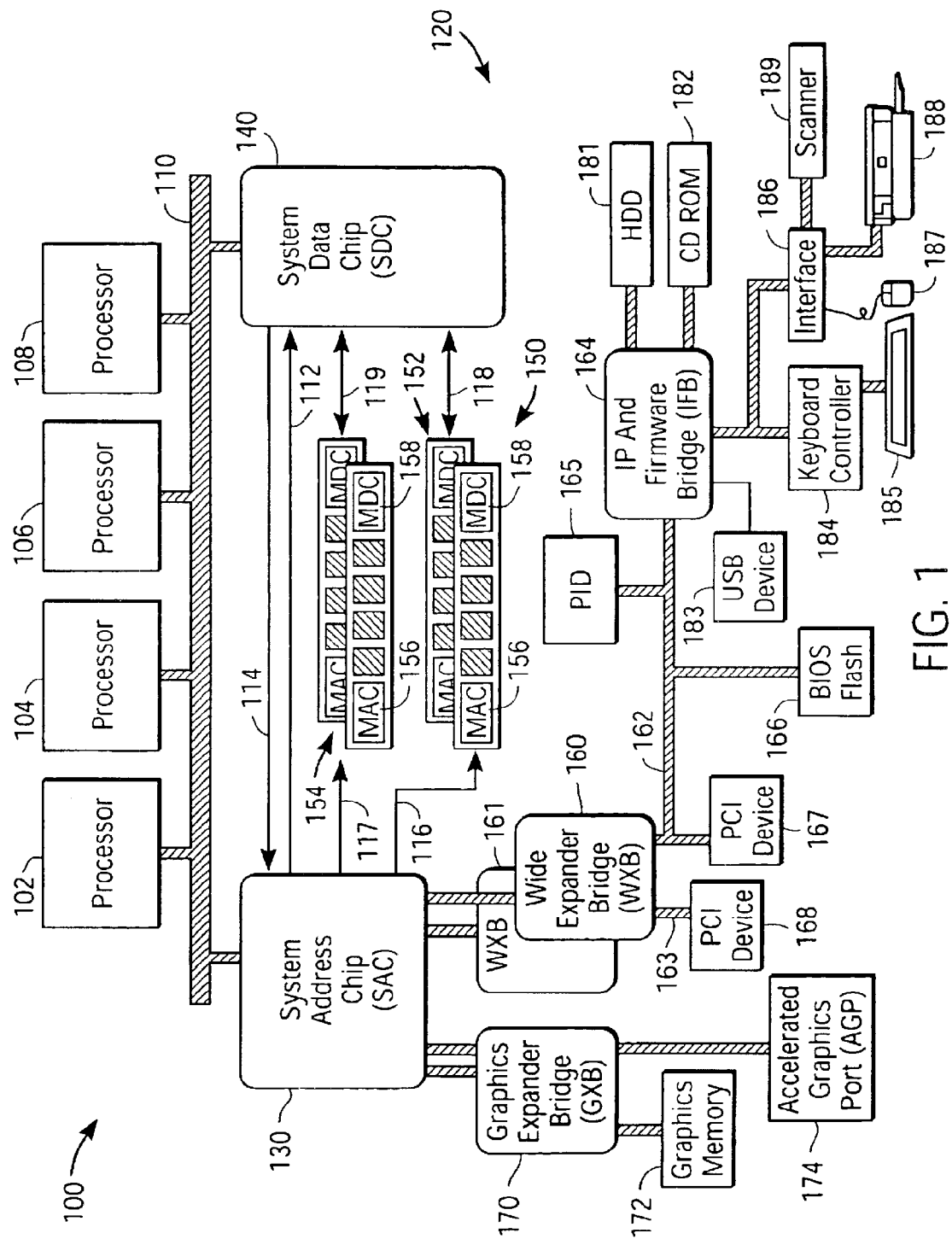
FIG. 1 illustrates a chipset which includes a configuration ring.

FIG. 1 illustrates an exemplary chipset-based system 100 including a configuration ring. Although described in the context of system 100, the present invention may be implemented in any suitable system.

As illustrated in FIG. 1, system 100 comprises processors 102, 104, 106, and 108, a processor bus 110, and a memory and input/output (I/O) chipset 120. Processors 102, 104, 106, and 108 and chipset 120 are coupled to processor bus 110. System 100 for other embodiments may comprise one, two, three, or more than four processors, for example.

Chipset 120 comprises a system address chip (SAC) 130 coupled to an address portion of processor bus 110 and a system data chip (SDC) 140 coupled to a data portion of processor bus 110. SAC 130 and SDC 140 for one embodiment are coupled to one another by a private command bus 112 and a private data bus 114. A main memory 150 is coupled between SAC 130 and SDC 140. Chipset 120 also comprises, for I/O access, two wide expander bridges (WXBs) 160 and 161 coupled to SAC 130 and an optional graphics expander bridge (GXB) 170 coupled to SAC 130. Chipset 120 for other embodiments may comprise only one WXB, for example. SAC 130 and SDC 140 provide an interface to processor bus 110 and provide control and data routing for main memory 150 and I/O access through WXBs 160 and 161 and GXB 170.

Main memory 150 for one embodiment comprises two memory subsystems 152 and 154. Each memory subsystem 152 and 154 may comprise any suitable memory, such as synchronous dynamic random access memory (SDRAM) for example. Each memory subsystem 152 and 154 comprises one or more memory address chips (MACs) 156 and one or more memory data chips (MDCs) 158. Each memory subsystem 152 and 154 for one embodiment comprises a memory card having two MACs 156 and four MDCs 158. MACs 156 and MDCs 158 belong to chipset 120. MACs 156 for one embodiment provide SDRAM row address strobe and column address strobe (RAS/CAS) generation and redriving of addresses to SDRAM. MDCs 158 for one embodiment multiplex data from SDRAM to SDC 140. On reads, MDCs 158 latch data from SDRAM and transfer the data to SDC 140 a predetermined number of bits at a time. On writes, MDCs 158 latch data from SDC 140 and write the data to SDRAM. SAC 130 for one embodiment addresses each memory subsystem 152 and 154 over a memory address bus 116 and 117, respectively. SDC 140 for one embodiment receives data from and transfers data to each memory subsystem 152 and 154 over a memory data bus 118 and 119, respectively.

WXB 160 provides a control and data interface for two independent PCI buses 162 and 163. WXB 161 functions similarly as WXB 160. Each WXB 160 and 161 is coupled to SAC 130. GXB 170 provides a control and data interface for a graphics memory device 172 and an accelerated graphics port (AGP) 174.

Chipset 120 further comprises a compatibility I/O and firmware bridge chip (IFB) 164, a programmable interrupt device (PID) 165, and a basic input/output system (BIOS) flash controller 166 each coupled to PCI bus 162. PCI bus 162 serves as a compatibility bus and supports IFB 164 for interfacing with suitable compatibility components such as, for example, a hard disk drive (HDD) 181, a compact disc read only memory (CD ROM) device 182, a suitable universal serial bus (USB) device 183, a keyboard controller 184 for controlling a keyboard 185, and a suitable interface 186 for a mouse 187, a printer 188, and a scanner 189. PID 165 is a PCI device that gathers interrupts and delivers them from PCI bus 162 to processor bus 110 through PCI writes to a predetermined address. One or more other suitable PCI devices 167 and 168 may be coupled to PCI buses 162 and 163.

It will be appreciated that many of the components described above may be implemented as separate integrated circuit chips or as portions of a single integrated circuit chip. In particular, System Address Chip 130, System Data Chip 140, Processors 102, 104, 106, and 108, and Processor Bus 110 may be implemented on a single chip in one embodiment for example. Likewise, some of the above components may be combined in a multi-chip module.

Figure 2A:
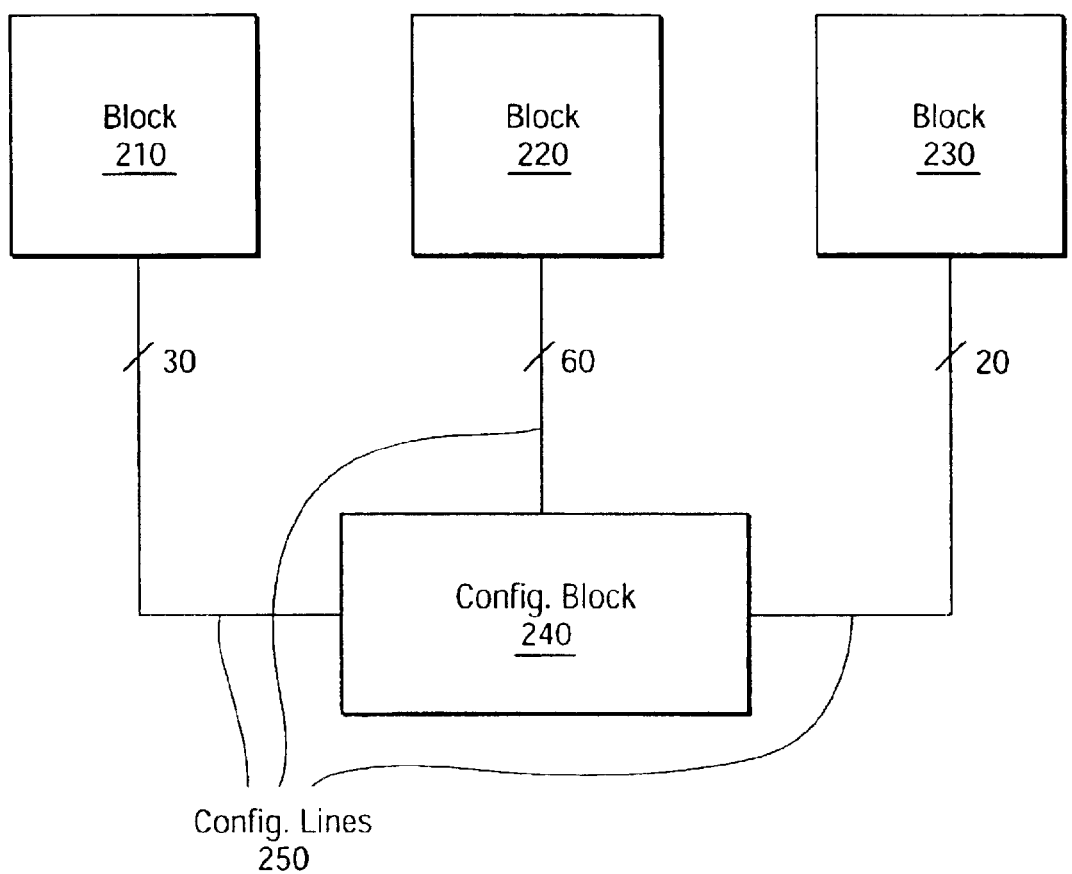
FIG. 2A illustrates a prior art scheme for deploying configuration bits.
Figure 2B:
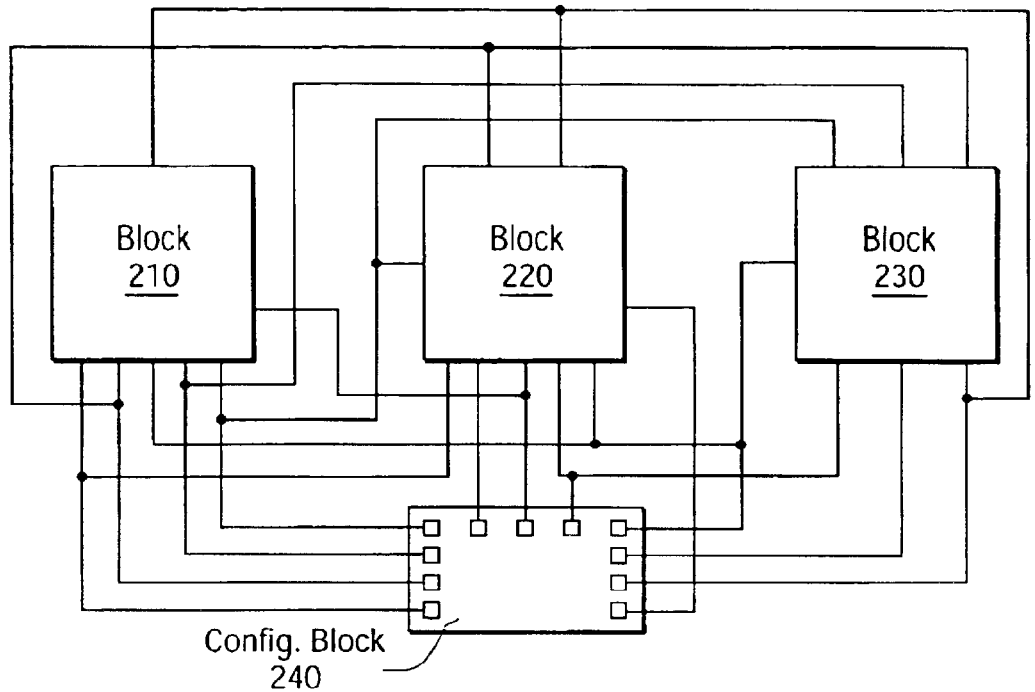
FIG. 2B illustrates a more detailed prior art scheme for deploying configuration bits.
Figure 2C:
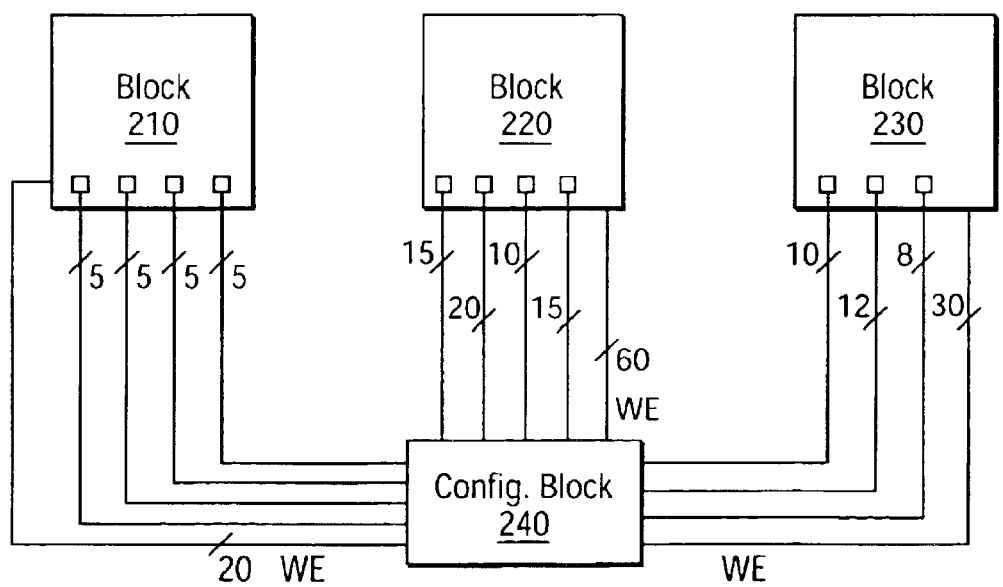
FIG. 2C illustrates a second more detailed prior art scheme for deploying configuration bits.
Figure 3:
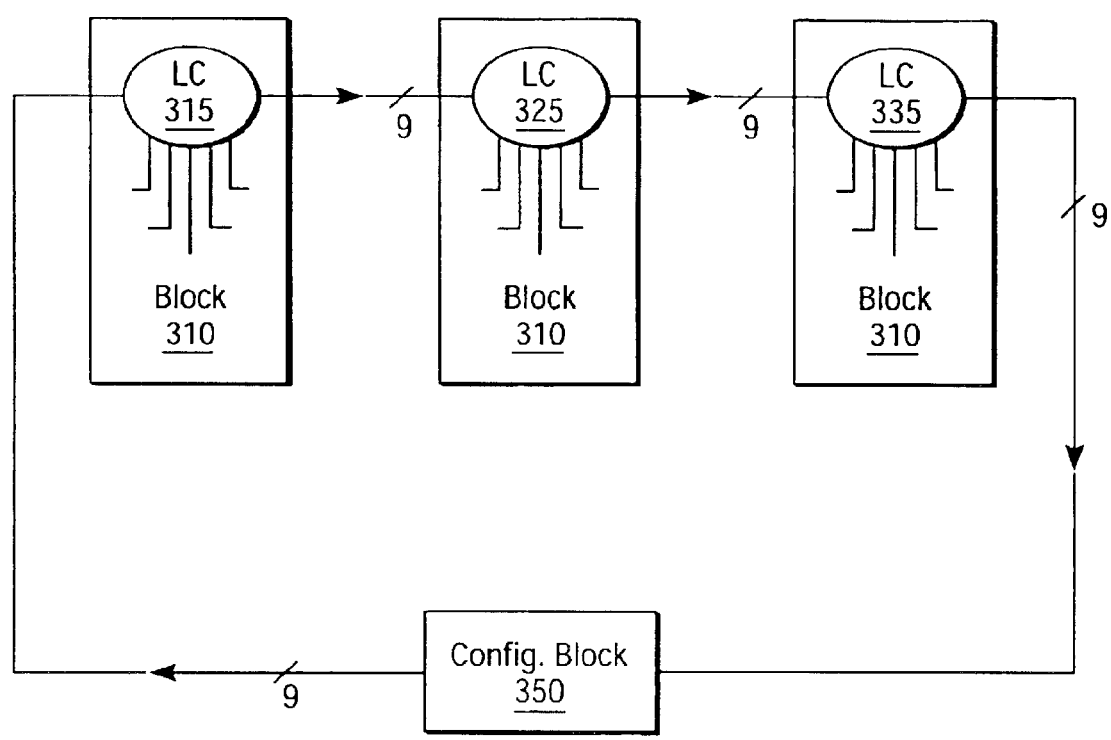
FIG. 3 illustrates an embodiment of an apparatus including configuration bits.

The centralization of the configuration circuitry is both something that contributes to the problems with routing configuration signals and something that may be avoided. In avoiding those problems, it is important that complexity of the new configuration system not outweigh the advantages of solving the problems. FIG. 3 illustrates an embodiment of a configuration bit distribution. BLOCK 310 contains Local Configuration 315. Coupled to Local Configuration 315 is Local Configuration 325, which is part of BLOCK 320. BLOCK 330 contain Local Configuration 335 which is coupled to Local Configuration 325. Finally, Configuration BLOCK 350 is coupled to both Local Configuration 315 and Local Configuration 335. The coupling is accomplished through use of a ring in one embodiment, and the ring includes eight signal lines and one control line. Furthermore, the ring passes from BLOCK to BLOCK in what appears logically to be a ring, thus requiring less global routing resources than a set of connections from the Configuration BLOCK 140 to the other BLOCKs of FIG. 2A. It will be understood that the physical layout of an integrated circuit often corresponds only somewhat to the logical layout or planning of the integrated circuit.

The embodiment of FIG. 3 may pass a packet of data from the Configuration BLOCK 350 (which originates the packet) to the Local Configuration block 315, thence to Local Configuration 325, thence to Local Configuration 335 and finally back to Configuration BLOCK 350 (which then removes the packet). Each Local Configuration block may decode the contents of the packet to determine whether it applies to the local configuration block in question simultaneously with passing the packet of data. In one embodiment, a packet may effectively be addressed to more than one target, with possibilities ranging from some bits associated with a packet being at one target and other bits being at a second target to requiring that individual bytes associated with a packet only address one target. Note that each block on the ring may be said to be coupled through the ring to any other block, even though other blocks provide intervening stations on the ring. Likewise, connection in the manner illustrated in FIG. 3 may be described as a circular daisy chain, with each block connecting its input to the output of the previous block and connecting its output to the input of the next block.

Figure 4A:
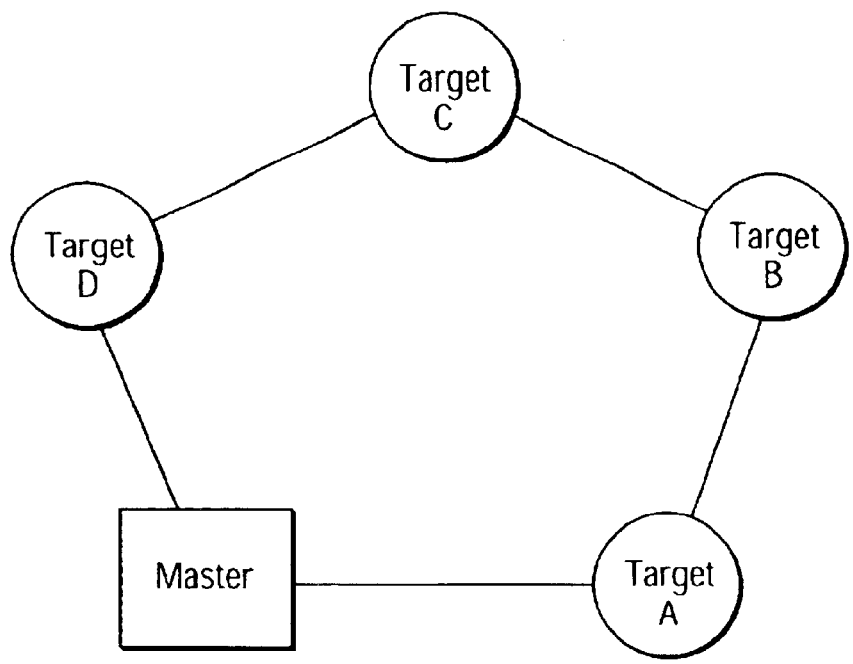
FIG. 4A illustrates an embodiment of a ring of configuration bit block s.

Turning to FIG. 4A, an alternative embodiment of a configuration bit distribution is illustrated. This may be viewed as similar to the illustration of FIG. 3. It provides for a Master 410, a Target A 415, Target B 420, Target C 425, and Target D 430 all chained together by a group of signals in the logical configuration of a ring. Again, such an arrangement provides for passing of packets along the ring. Each packet contains, in one embodiment, an address indicating which of the targets it is addressed to. The target addressed by the packet decodes the packet and acts appropriately on the contents of the packet, typically either reading data out of its associated configuration registers or writing data into its associated configuration registers, thereby utilizing the packet.

Figure 4B:
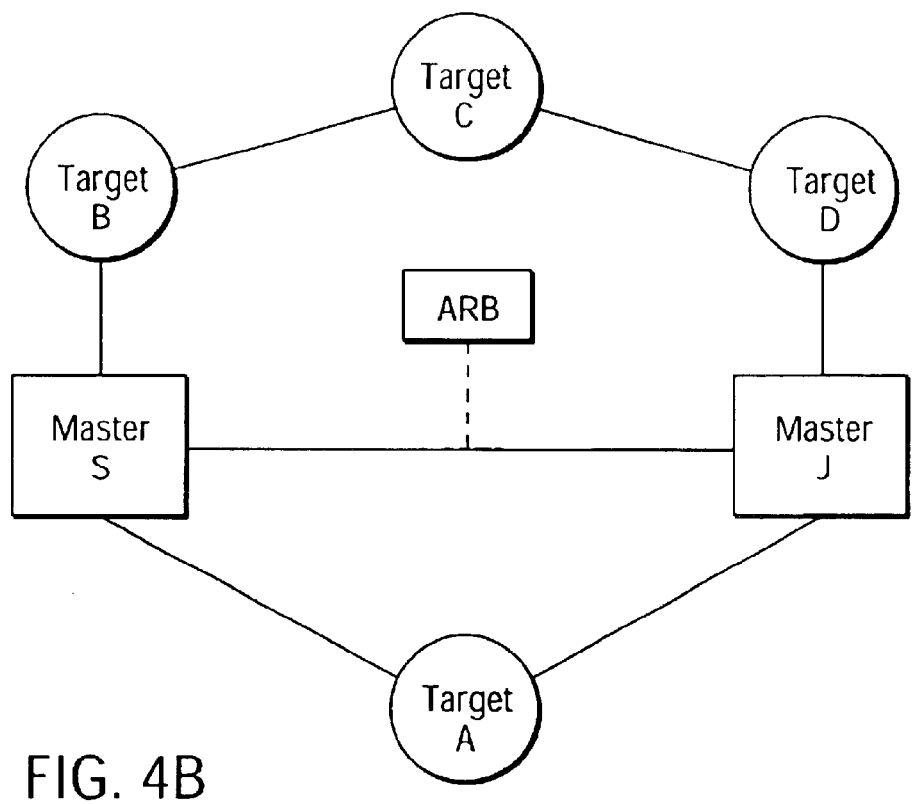
FIG. 4B illustrates an alternative embodiment of a ring of configuration blocks.

Likewise, FIG. 4B illustrates a similar configuration. However, two Masters, Master S 440 and Master J 445 are included, along with Arbitration Unit 450. In one embodiment, Master S 440 and Master J 445 have equal access to the ring of targets, and Arbitration Unit 450 determines which master may use the ring when conflicts arise. It will be appreciated that the arbitration functions may be defined to favor one of the two masters, and that such functions may be performed either in a separate logic block, in a sub-block of one of the masters, or distributed between the two masters. In one embodiment, in keeping with the design theme of avoiding centralization, the arbitration circuitry is entirely embodied in the two masters (a primary master and a secondary master, with the primary master having priority) on the ring which are coupled together independently of the ring for arbitration purposes.

Figure 4C:
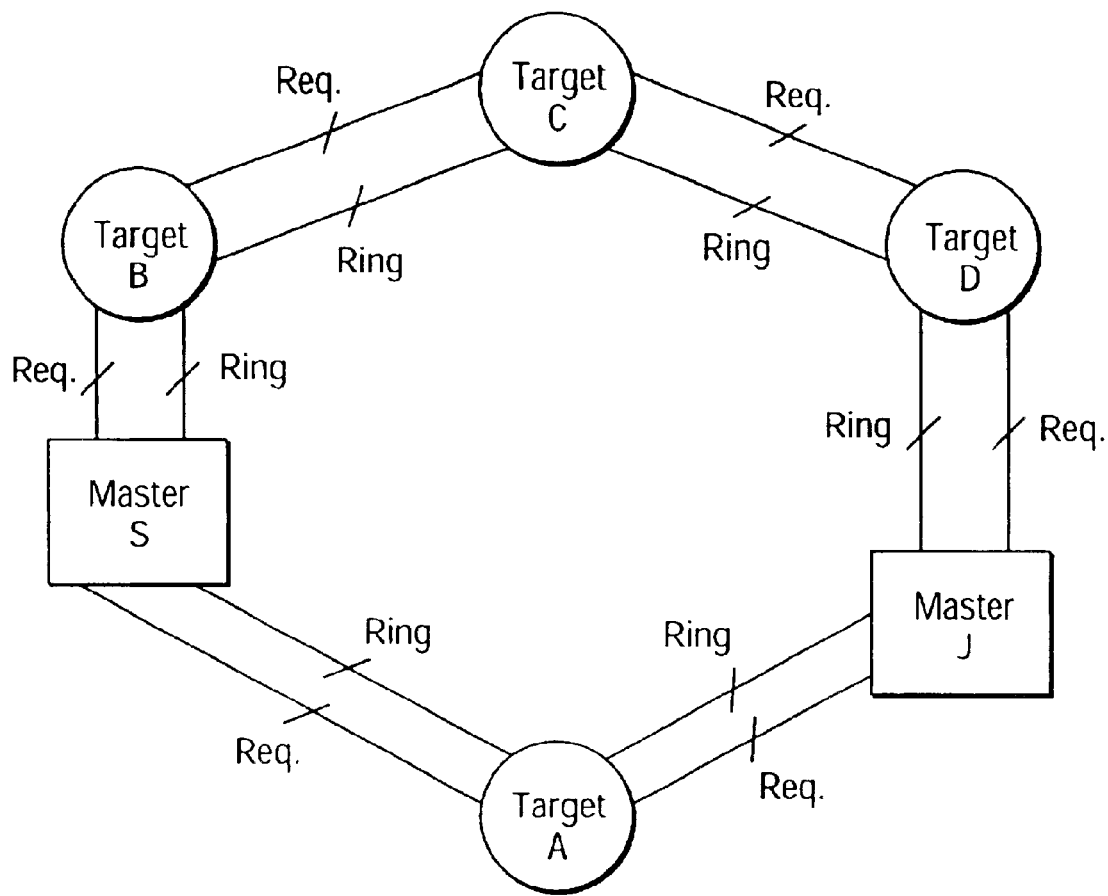
FIG. 4C illustrates another alternative embodiment of a ring of configuration blocks.

Furthermore, FIG. 4C illustrates yet another alternative embodiment of a configuration bit distribution. In this embodiment, a separate Request line 470 is deployed between each station on the ring, separately from the group of signals which form the ring. In one embodiment, Request line 470 is asserted by a master such as Master S 440 or Master J 445 when that master needs control of the ring. Whereas data in packets is propagated in a first direction on the ring (such as a logical clockwise direction), the signal on the request line 470 is propagated in a second direction on the ring which is opposite the first direction. By propagating the request signal in the opposite direction, the request signal travels independently of traffic on the ring, and there is no relation between when a packet originated and when a request signal is either asserted or received. The ring is granted to the requesting master by assertion of a separate grant signal which is routed along with the ring and may be thought of as part of the ring. This arrangement tends to result in control of the ring moving with the flow of data, and, if masters are implemented to grant the ring upon completion of the origination of a packet, leads to equal access to the ring by all masters. It will be appreciated that the embodiments illustrated in FIGS. 4A, 4B, and 4C all may be expanded and generalized to a large number of targets and masters without departing from the spirit and scope of the invention.

It will be appreciated that arbitration may occur in other ways as well. For instance, a master on a ring may have multiple sources of commands or data for origination of packets, and the master may arbitrate between those sources, or there may be a separate arbitration block determining which source works with the master at a given time. Furthermore, while reading and writing registers is the most common function of targets, targets may also read and write memory or perform other functions to utilize the packets, those functions being appropriate to the target in question and the circuitry implementing the target.

Figure 5A:
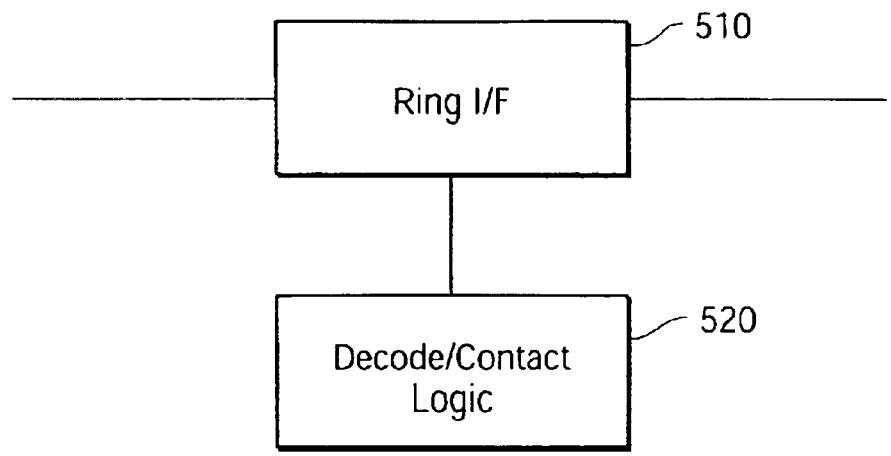
FIG. 5A illustrates an embodiment of a block suitable for use in conjunction with a ring of configuration blocks.

Turning to FIG. 5A, an embodiment of a block suitable for use in connection with a configuration ring is illustrated. In this instance, the block includes Ring Interface 510 coupled to Decode and Control Logic 520. Ring Interface 510 connects or couples to the ring, thereby receiving and sending data. Decode and Control Logic 520 utilizes the data from the ring to determine whether information on the ring is intended for this block. If the data is intended for the block, it is then used, typically either to update the configuration or to cause the configuration registers to be read out onto the ring. The configuration is updated in the case of a write to the configuration and is sampled in a read. Additionally, if the block is a master, it may use Decode and Control Logic 520 to originate or produce packets which contain information useful for causing a read or a write of a configuration bit or bits.

Figure 5B:
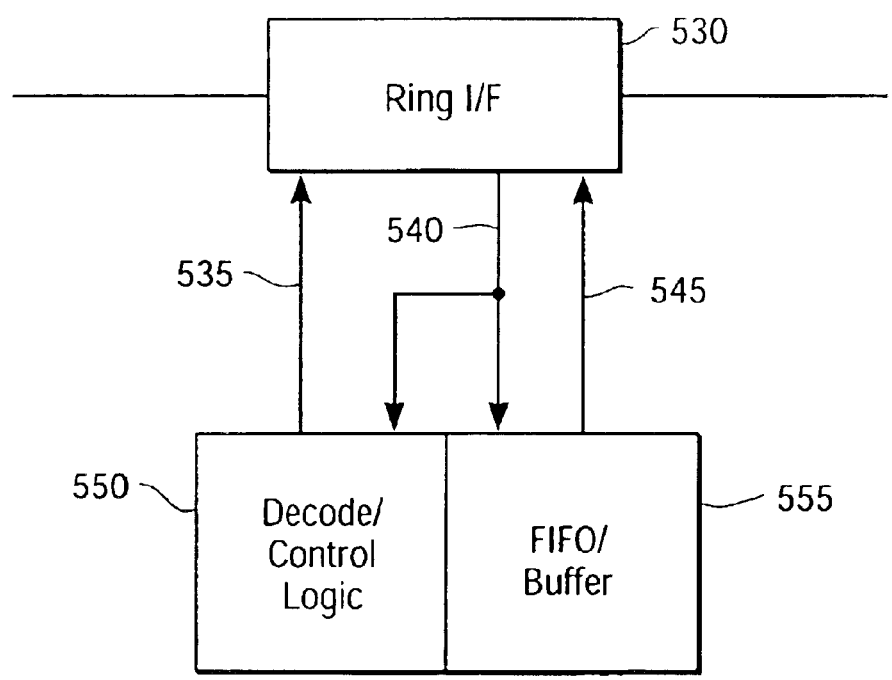
FIG. 5B illustrates an alternate embodiment of a block suitable for use in conjunction with a ring of configuration blocks.

Turning to FIG. 5B, an alternative embodiment of a block suitable for use with a configuration network is illustrated. The block of FIG. 5B may be more suitable for use as a master of a ring. It includes Ring Interface 530, which couples or connects to the ring similarly to Ring Interface 510. It also includes Decode and Control Logic 550 combined with Buffer 555. In one embodiment, Buffer 555 is a FIFO buffer. Decode and Control Logic 550 may send signals to Ring Interface 530 along coupling 535, which in one embodiment is a small group of signals including both control and data. Ring Interface 530 sends data to both Decode and Control Logic 550 and Buffer 555 along coupling 540, which in one embodiment is a group of data signals. Buffer 555 may send data to Ring Interface 530 along coupling 545, which in one embodiment is a group of data signals. It will be appreciated that coupling 535, coupling 540, and coupling 545 may all be combined together or separated as appropriate, and need not duplicate signals.

Decode and Control Logic 550 controls the actions of the block, controlling whether Ring Interface 530 passes along data received directly from the ring or from Buffer 555, whether Buffer 555 captures the data received by Ring Interface 530, and how the block acts upon that data. For instance, Decode and Control Logic 550 controls whether data is read from or written to the configuration bits local to the block, and also controls whether a packet is originated from the block. In one embodiment, a packet may be originated at the end of any received packet. All data received while the packet is originated is stored in Buffer 555 during origination. Thus, in one embodiment, Buffer 555 must be able to store as much data as would be transmitted during origination of a packet by the block. After the packet is originated, the data from Buffer 555 is transmitted in a first-in-first-out manner, such that the Buffer 555 effectively becomes part of the ring. The Buffer 555 is used to store information until the packet originated by the block returns to the block, and is removed by the block from the ring, at which point no data need be buffered. Furthermore, it will be appreciated that any cycles on the ring that are empty need not be stored in the buffer, so the buffer need not be full even though a packet originated by the block is on the ring.

Figure 6A:
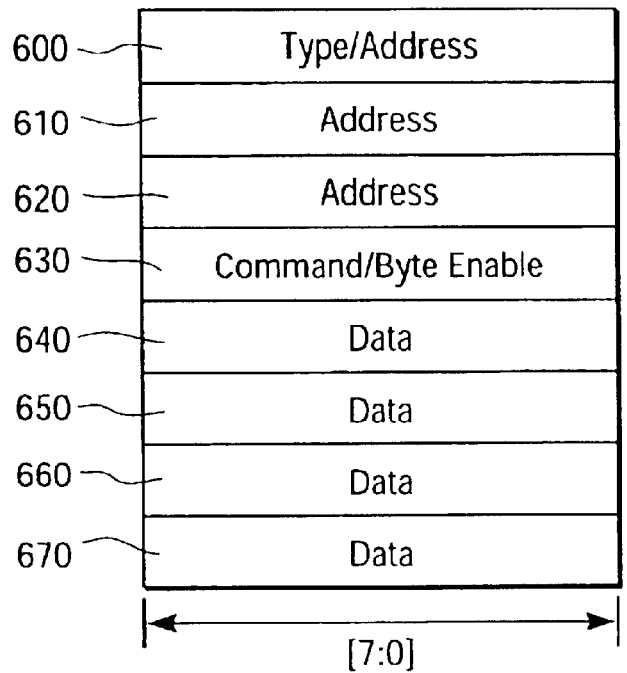
FIG. 6A illustrates a packet suitable for transmission between configuration blocks on a ring.

Turning to FIG. 6A, an embodiment of a packet suitable for use in a configuration ring is illustrated. The packet includes Type and Address field 600, Address field 610, Address field 620, and Command and Byte Enable field 630. Additionally, the packet includes Data field 640, Data field 650, Data field 660 and Data field 670. Each field contains 8 bits, numbered 0 through 7. In one embodiment, Type of access is represented by the first two bits of Type and Address field 600, and indicates what type of access, such as configuration or non-configuration is occurring. The rest of Type and Address field 600, and all of Address field 610 and Address field 620 contain address bits indicating which configuration bits are to be accessed. Command and Byte Enable 630 contains a specification of what operation should occur, such as read or write for instance, in the command portion of the field and contains four bits of Byte Enable information in the Byte Enable portion. The Byte Enable information indicates which of the four following data fields either have valid data for a write or should be replaced by valid data for a read. Finally, each of the data fields contains either data to be written, or, in one embodiment, are all set to one ('1') so that the information may be replaced on a read. In such an embodiment, a return of all ones in the read data may indicate an error in reading the data or transmission of the data, and is generally treated as an indication that a read of a non-existent register was attempted. In one embodiment, Address field 600 includes an identifier of three bits which indicates which master originated the packet, thereby allowing a master to identify its packet and remove it from the ring when it has been passed all the way around.

One description of the contents of each of the eight bytes is embodied in the following table:

Note that the Configuration Space accesses are of primary interest here, and in one embodiment, the reserved bits of A0 are used to encode a master ID code and a bus number in accordance with PCI bus numbering. The master ID code is used by masters on the ring to recognize when a packet originated by a master has circulated through the entire ring and should therefore be removed from the ring. The Memory Mapped transaction may be used to program a memory map such as that found in a memory management unit. The Functional transaction may be used to implement programming of a functional (rather than a configuration) register in an integrated circuit. The Debug and Test transaction may be used to program special debug/test bits or registers in a circuit, or to program the configuration bits in a test mode. The above table illustrates how the address fields of the packet are broken down into sub-fields, which may correspond to particular blocks of circuitry or registers for sub-circuits within those blocks. Also, the table illustrates that the command may be a single bit indicating either a read or a write, and that the Byte Enable bits may be set to zero or one to indicate which bytes should be used for reading or writing.

Figure 7:
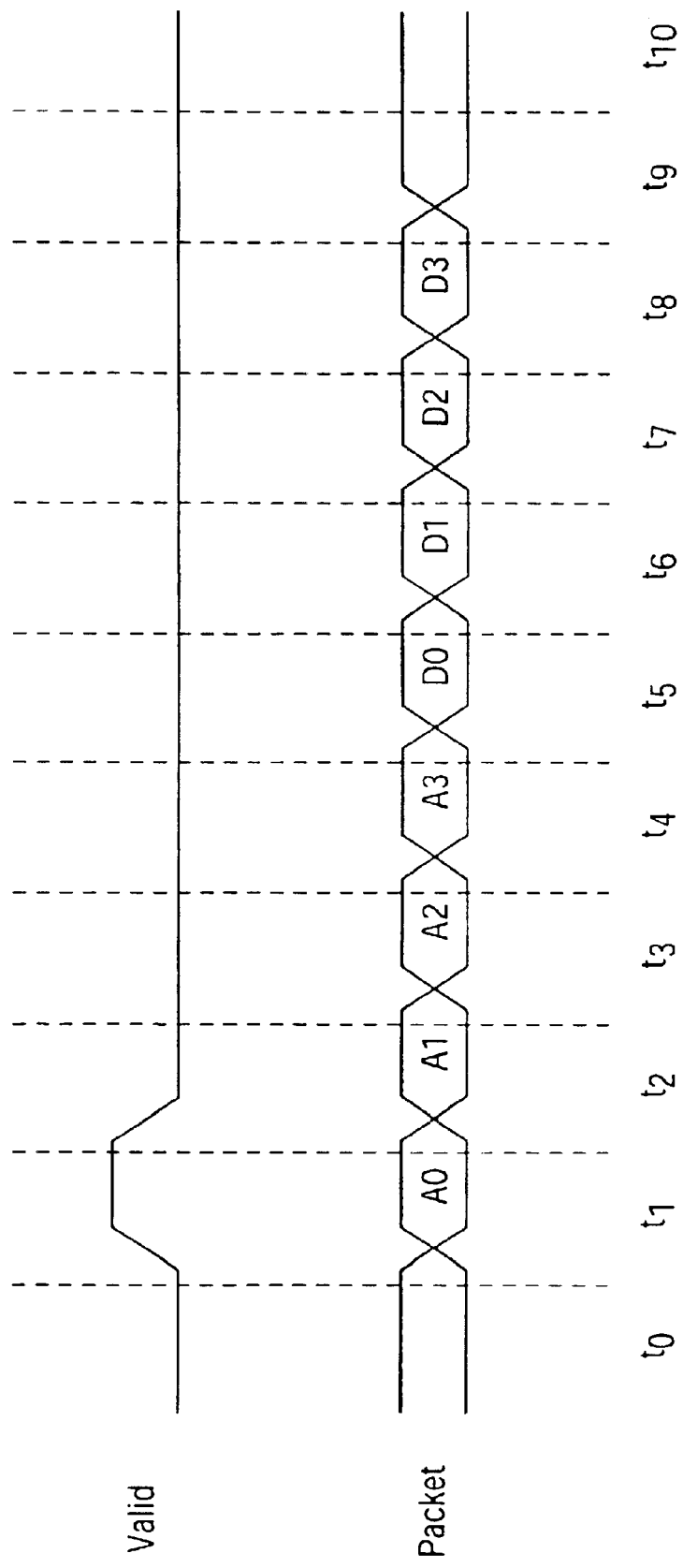
FIG. 7 illustrates timing of a packet of the form of FIG. 6A on a configuration ring.

FIG. 7 illustrates the timing of circulation on the ring of a packet as illustrated in FIG. 6A. In one embodiment, Valid signal 790 is asserted when the first byte of information, A0, in the packet 795 is valid on the ring, thus signaling the beginning of a packet. In this illustration, that occurs during time interval $t_1$. As time progresses through intervals $t_2$ to $t_8$, the succeeding bytes A1, A2, A3, D0, D1, D2, and D3 are passed on the ring. In one embodiment, the time intervals $t_0$ through $t_{10}$ correspond to clock cycles associated with the ring. In an alternate embodiment, the data portion (D0, D1, D2, and D3) of the packet may be separated by a number of cycles from the address portion (A0, A1, A2, and A3), and the signal for the beginning of the data portion is the assertion of the valid signal again. Note that A0 corresponds to Type/Address 600, A1 to Address 610, A2 to Address 620, A3 to Command/Byte Enable 630, D0 to Data 640, D1 to Data 650, D2 to Data 660, and D3 to Data 670 in one embodiment.

Figure 6B:
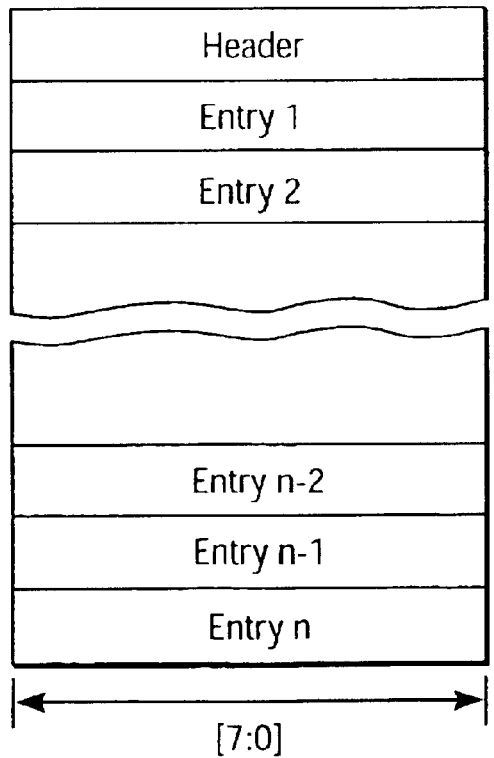
FIG. 6B illustrates a header and a packet of n additional bytes.

An alternate embodiment of a packet is illustrated in FIG. 6B. In this packet, a Header 690 includes an indication of the length of the packet, in this case n entries. The Header 690 is then followed by entry 1, entry 2, on up to entry n. In one embodiment, each entry and the Header 690 are all 8 bits wide.

Figure 8:
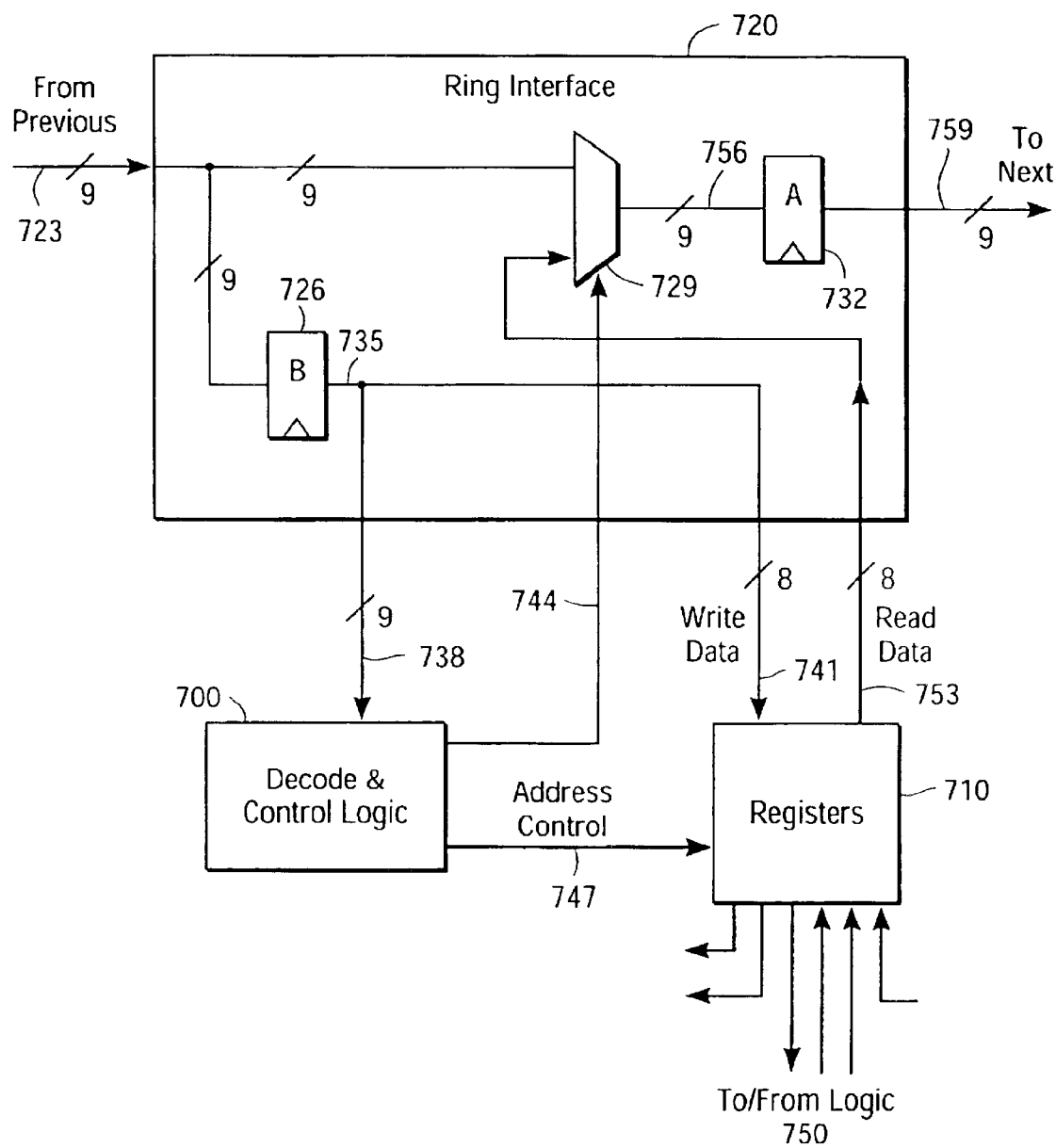
FIG. 8 illustrates an alternate embodiment of a block suitable for use in conjunction with a ring of configuration blocks.

A local configuration block suitable for use in conjunction with a configuration ring is illustrated in FIG. 8. This particular embodiment of a local configuration block is well

| Transaction Type[a] Phase | Configuration Space | Memory Mapped | Functional | Debug/Test Space |
|---|---|---|---|---|
| A0 | 00xxxxxb | 01xxxxAA | 10xxxxAA | 11xxxxAA |
| A1 | ddddffff | AAAAAAAA | AAAAAAAA | AAAAAAAA |
| A2 | rrrrrrrr | AAAAAAAA | CxxBBBBB | AAAAAAAA |
| A3 | CxxxBBBB | CxxxBBBB | DDDDDDDD[b] | CxxxBBBB |
| D0 (MSB) | DDDDDDDD | DDDDDDDD | DDDDDDDD | DDDDDDDD |
| D1 | DDDDDDDD | DDDDDDDD | DDDDDDDD | DDDDDDDD |
| D2 | DDDDDDDD | DDDDDDDD | DDDDDDDD | DDDDDDDD |
| D3 (LSB) | DDDDDDDD | DDDDDDDD | DDDDDDDD | DDDDDDDD |

[a] transaction type can be identified by the two most significant bits in phase A0. The bit fields for all phases are shown using the following key: 0 = logical zero, 1 = logical one, x = reserved (must be set to 0), b = bus number, d = device id, f = function, r = register index, C = command (not read/write), B = byte enables, D = data (most significant bytes transfer first).
[b] For Functional Accesses, an additional Data Byte is traded for a Byte of Address to allow larger registers to be updated suited for use as a target on a configuration ring. Ring Interface 720 couples the block to the ring, connecting it to signals 723 from the previous block in the ring and to signals 759 which connect to the next block in the ring. Signals 723 enter Ring Interface 720 and are routed directly to both MUX 729 and Flip-flop 726. Note that in one embodiment, signals 723 and signals 759 include nine bits or signals, eight of which represent the address or data of the packet and the other one of which represents the valid signal. Signals 723 are propagated through Flip-flop 726 to become signals 735, which are routed as signals 738 to Decode and Control Logic 700 and are routed without the valid signal to Registers 710 as potential Write Data 741.

Decode and Control Logic 700 processes signals 738 to determine how to control MUX 729 via control signal 744 and how to control Registers 710 via Address and Control signals 747. Registers 710 may accept data for writing from Write Data 741 or sample data in configuration registers for reading as Read Data 753. In the case of a write, Decode and Control Logic 700 causes Registers 710 to write into the appropriate configuration bit storage devices the values received on Write Data 741. In the case of a read, Decode and Control Logic 700 causes Registers 710 to sample the contents of the appropriate configuration bit storage devices and those values go as Read data 753 to MUX 729. MUX 729 is controlled by control signal 744, causing the sampled or read data to pass as signals 756 to Flip-flop 732, and then as signals 759 to the next block on the ring. Note that in one embodiment, Registers 710 stores all of the configuration bits for the local configuration, and To/From Logic routing 750 serves to route those signals within the logic block.

It will be appreciated that this embodiment illustrated in FIG. 8 is designed to work with a packet such as that in FIG. 6A. The first four bytes of a packet are decoded by Decode and Control Logic 700, allowing a determination to be made whether the MUX 729 should be switched from a pass-through mode of passing signal 723 to signal 756 to a pass read data mode of passing Read data 753 to signals 756. Likewise, during the time used to decode the four address bytes, access of the appropriate registers in Registers 710 may occur, thereby making Read data 753 available to MUX 729 when the data portion of the packet is on the ring and must be replaced by the data read. Moreover, the data may be replaced selectively when only some of the bytes are enabled for reading, and data may similarly be written selectively when only some the bytes are enabled for writing. It will also be appreciated that the granularity of enablement for reading and writing may be implemented at a lower level, such as the bit level.

Figure 9A:
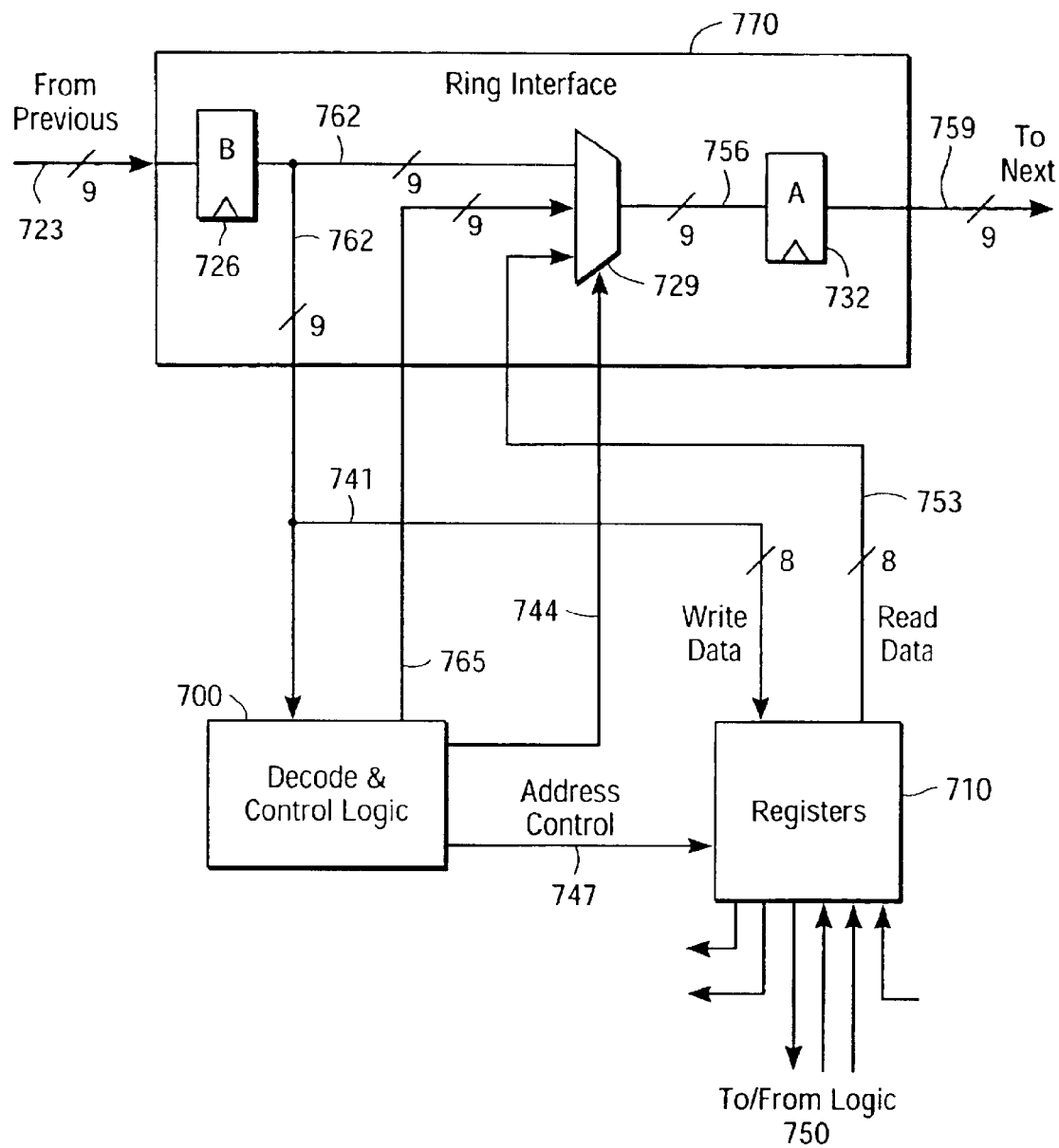
FIG. 9A illustrates another alternate embodiment of a block suitable for use in conjunction with a ring of configuration blocks.

Turning to FIG. 9, a local configuration block suitable for use as a master on a configuration ring is illustrated. Ring Interface 770 is similar to Ring Interface 720 of FIG. 8. However, Flip-flop 726 is connected such that all data passing through Ring Interface 770 must pass directly through Flip-flop 726 to be either altered or passed on. As a result, Decode and Control Logic 700 receives signals 762, the output of Flip-flop 726, and may control MUX 729 via control lines 744 to cause signals 762 to not be passed through to the next block on the ring. This is particularly useful when a master recognizes that a packet the master originated has passed completely around the ring and should then be removed. In one embodiment, the packet is identified when an ID code is detected in the first byte of the packet, and then all eight bytes of the packet are intercepted before they propagate. In their stead, either empty cycles or another packet may be passed. Otherwise, the block in FIG. 9A functions essentially the same way as the block in FIG. 8. It will be appreciated that the Decode and Control Logic 700 must in this instance be capable of generating or originating packets.

Figure 9B:
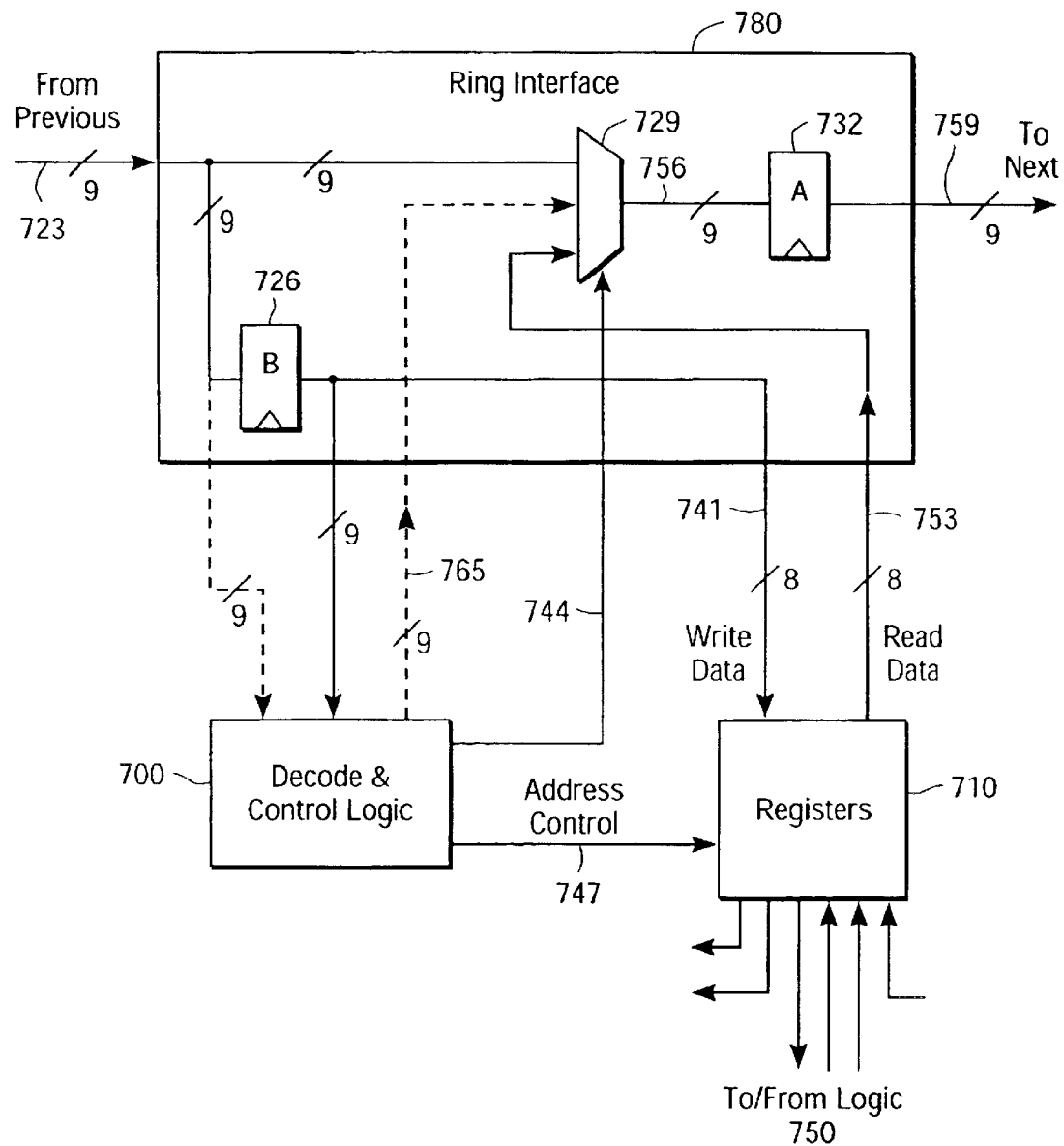
FIG. 9B illustrates yet another alternate embodiment of a block suitable for use in conjunction with a ring of configuration blocks.

Alternatively, FIG. 9B illustrates an alternative embodiment of a block suitable as a master on a configuration ring. FIG. 9B is identical to FIG. 8 in operation and configuration with three exceptions. First, signals 723 are routed directly to Decode and Control Logic 700 for purposes of detection of packets originated by the master which may be removed. Likewise, signals 765 are routed to the MUX 729 for purposes of removing such packets. Finally, control signals 744 must control a 3:1 MUX in MUX 729 to cause the removal of packets.

Figure 10:
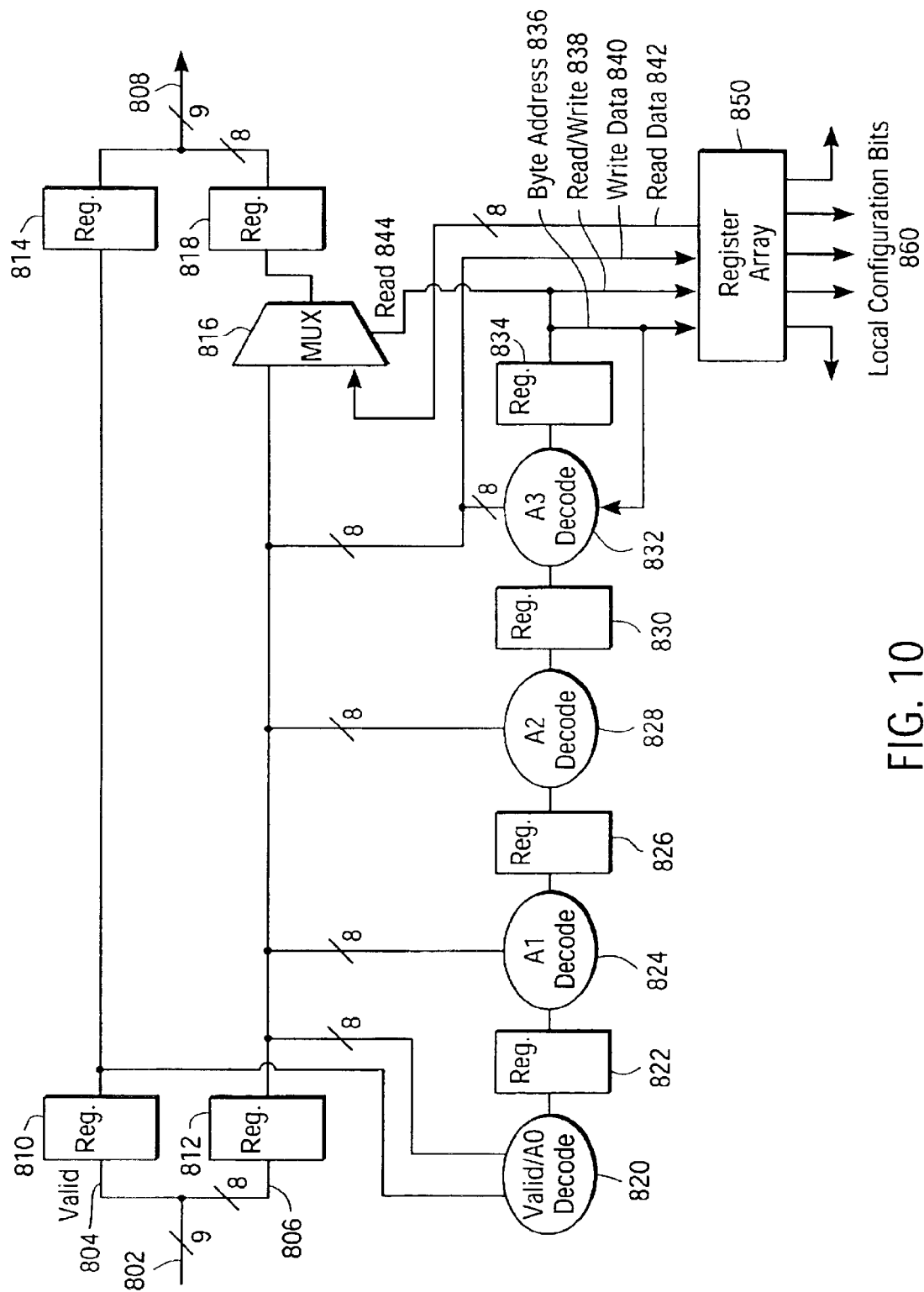
FIG. 10 illustrates another alternate embodiment of a block suitable for use in conjunction with a ring of configuration blocks.

A further alternative embodiment of a block suitable for use in a configuration ring is illustrated in FIG. 10. This block is suitable primarily as a target. Incoming signal 802 includes the 8 data bits 806 and valid bit 804. Register 810 receives the value of valid bit 810 and register 812 receives the values of the 8 data bits 806. Valid and A0 Decode 820 receives the outputs of register 810 and register 812, and thereby determines whether the beginning of a packet is encoded by the values of incoming signals 802. The results of this determination and the decoding of a first address byte such as Address 600 are stored in register 822. A1 Decode 824 receives the value of register 822 along with the value of register 812, and thereby determines whether a second byte of address data such as Address 610 is present and needs to be decoded, storing its results in register 826. A2 Decode 828 receives the value of register 826 along with the value of register 812 and determines whether a third address byte such as Address 620 is present, and if necessary decodes the third address byte and stores the results in register 830. Finally, A3 Decode 832 receives the value of register 830 and the value of register 812, along with the fedback value of register 834. If a third address byte such as Address 630 needs to be decoded, that occurs and the results are stored in register 834. If the data portion of the packet is cycling through, the fedback value of register 834 allows A3 Decode 832 to control Register Array through Byte Address 836 and Read/Write 838 lines, thus causing either the writing of Write Data 840 or the reading/sampling of Read Data 842 from the appropriate storage locations. Read Data 842 is routed to MUX 816, and Read signal 844 determines whether Read Data 842 replaces the value of register 812 in register 818. Register 814 meanwhile receives the value of the valid signal 804 from register 810. The values of registers 814 and 818 are passed on to the next block on the ring as signals 808. It will be apparent that Register Array 850 stores the local configuration bits for a block such as Block 310, Block 320, or Block 330, and that Local Configuration Bits 860 route to the locations where those values are utilized by the circuit.

Furthermore, it will be apparent that Local Configuration 315, Local Configuration 325, and Local Configuration 335 may be any one of the blocks illustrated in FIGS. 8, 9A, 9B, and 10 or a similar logic block.

Figure 11:
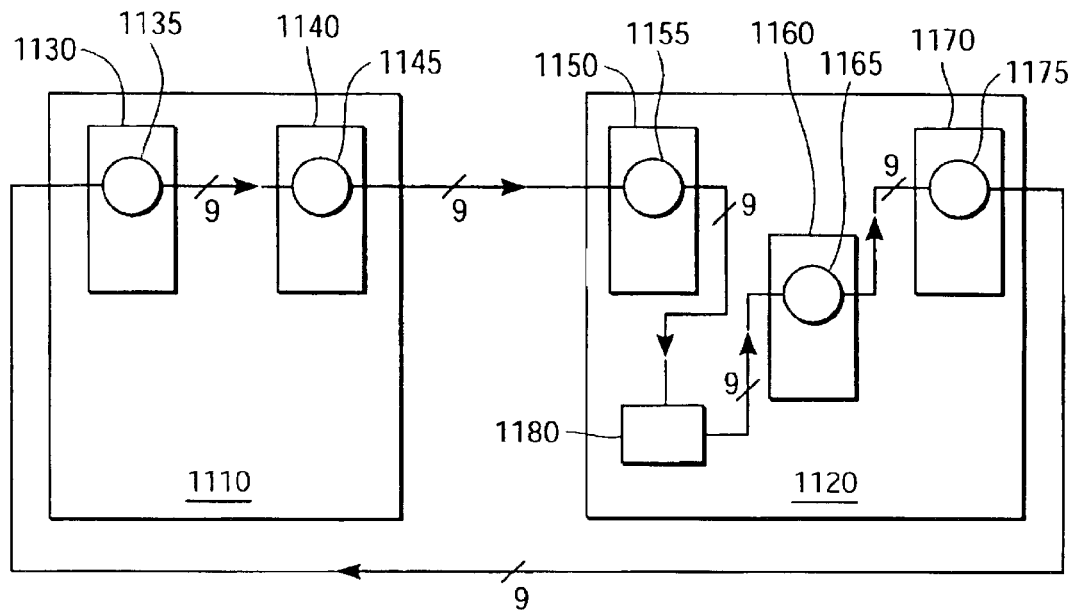
FIG. 11 illustrates a ring of configuration blocks across two separate chips.

FIG. 11 illustrates one embodiment of a configuration ring routed between two chips or integrated circuits, such as two chips of a multi-chip-module or two separate integrated circuits. First integrated circuit 1110 contains functional block 1130 which contains local configuration 1135. A 9 bit wide signal group couples local configuration 1135 to local configuration 1145 of functional block 1140. Likewise, a 9 bit wide signal group goes off-chip to couple local configuration 1145 to local configuration 1155 of functional block 1150 on second integrated circuit 1120. Local configuration 1155 is coupled by another 9 bit wide group of signals to ring master 1180. Ring Master 1180 is in turn coupled to local configuration 1165 of functional block 1160 by another 9 bit wide group of signals. Local configuration 1165 is coupled to local configuration 1175 of functional block 1170 by another 9 bit wide group of signals. Finally, a 9 bit wide group of signals goes off-chip from local configuration 1175 to local configuration 1135 to complete the ring. It will be appreciated that in one embodiment, the 9 bit wide groups of signals carry the valid and data signals, that each local configuration block handles configuration for the corresponding functional block, and that the ring master controls the entire configuration ring. Furthermore, it will be appreciated that multiple masters, additional local configuration blocks, and additional signals may be routed as part of the ring.

Figure 12:
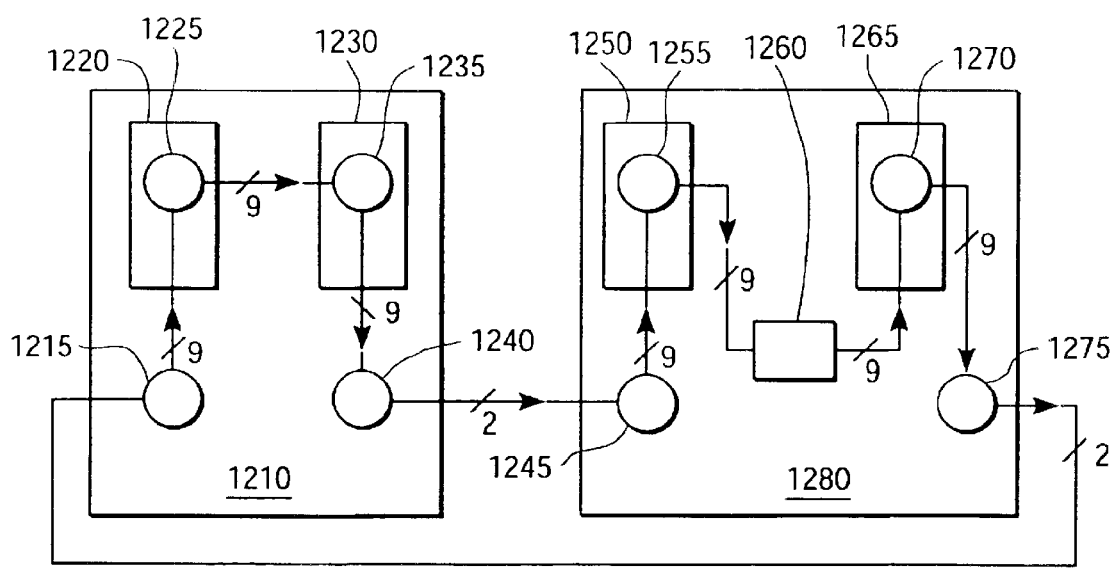
FIG. 12 illustrates an alternate ring of configuration blocks across two separate chips.

FIG. 12 illustrates an alternate embodiment of a configuration ring spanning two integrated circuits. Integrated circuit 1210 includes functional block 1220 which includes local configuration 1225. Local configuration 1225 is coupled by a 9 bit group of signals to local configuration 1235 of functional block 1230. Local configuration 1235 is coupled by a 9 bit group of signals to Parallel to Serial converter 1240, which sends signals off-chip in a 2 bit group to Serial to Parallel converter 1245 of integrated circuit 1280. Serial to Parallel converter 1245 is coupled to local configuration 1255 of functional block 1250 by a 9 bit group of signals. Local configuration 1255 is coupled to ring master 1260 by a 9 bit group of signals, which is coupled to local configuration 1270 of functional block 1265 by another 9 bit group of signals. Local configuration 1270 is coupled to Parallel to Serial converter 1275 by a 9 bit group of signals, and Parallel to Serial converter 1275 couples to Serial to Parallel converter 1215 of integrated circuit 1210 through a group of 2 signals. Finally, Serial to Parallel converter 1215 is coupled to local configuration 1225 of functional block 1220 by a 9 bit group of signals. As will be appreciated, the serial to parallel and parallel to serial converters may be implemented to convert at high data rates, thus maintaining the throughput of the ring. The two bit signals between the integrated circuits allow for less complexity in bonding out signals to go off-chip.

Figure 13A:
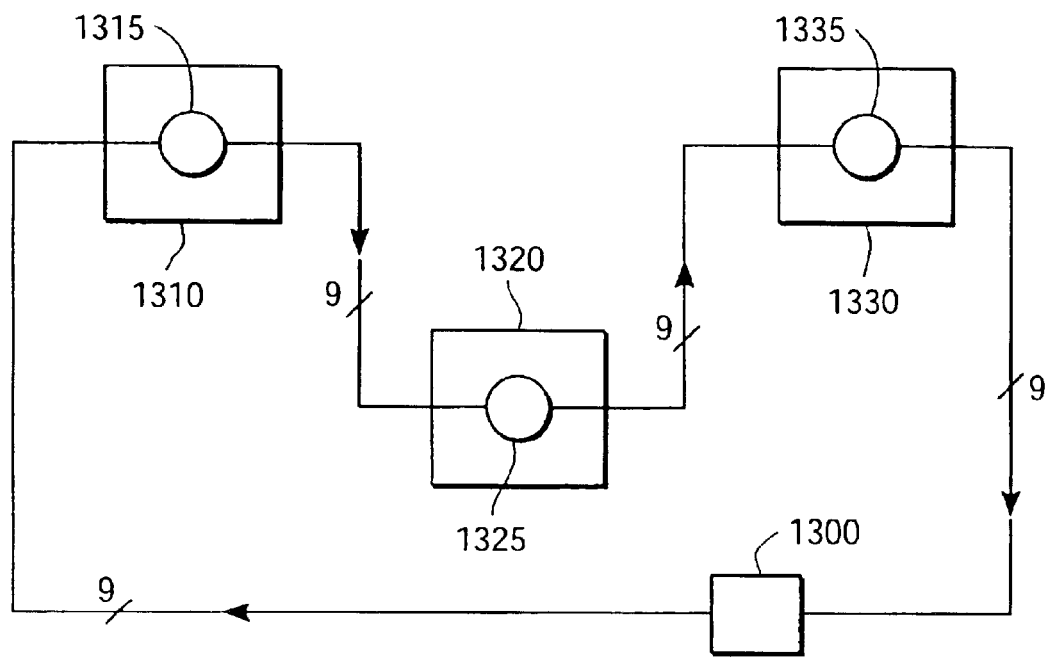
FIG. 13A illustrates a first configuration of a ring of configuration blocks.
Figure 13B:
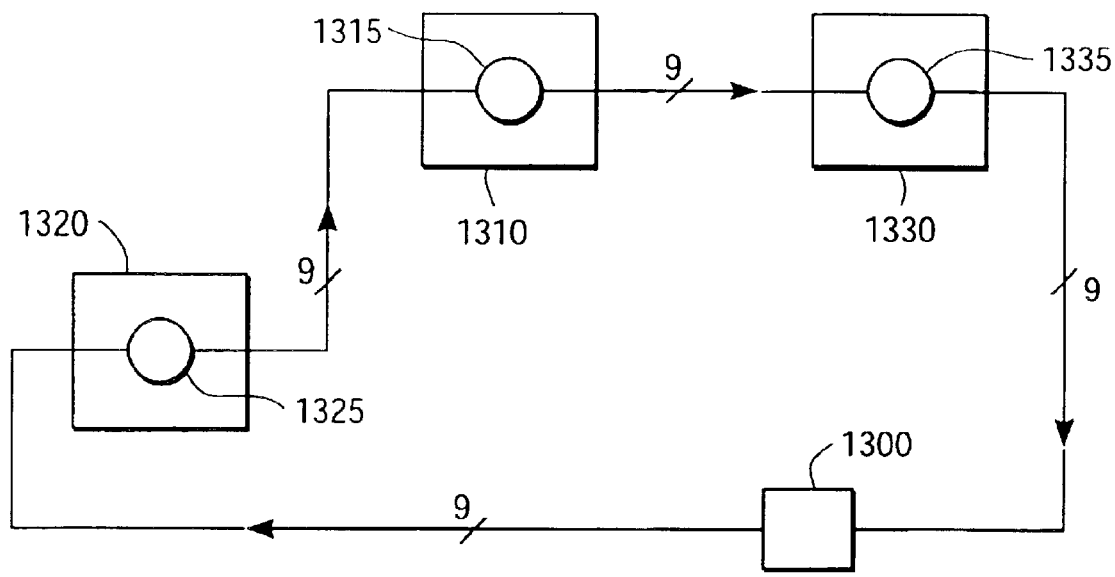
FIG. 13B illustrates a second configuration of a ring of configuration blocks.

FIGS. 13A and 13B illustrate the flexibility of design in a configuration ring. FIG. 13A illustrates a planned layout of an integrated circuit and configuration ring. Ring master 1300 is coupled to local configuration 1315 of block 1310, which in turn is coupled to local configuration 1325 of block 1320, which in turn is coupled to local configuration 1335 of block 1330, which in turn is coupled to Ring master 1300, thus completing the ring. However, changes in the design result in an integrated circuit as illustrated in FIG. 13B, where the connection of the ring is not what was originally planned.

Ring master 1300 is coupled to local configuration 1325 of block 1320. Local configuration 1325 is coupled to local configuration 1315 of block 1310. Local configuration 1315 is coupled to local configuration 1335 of block 1330. Local configuration 1335 is coupled to Ring master 1300 to complete the ring. As is apparent, blocks 1320 and 1310 swapped locations on the ring as represented by local configuration 1315 and 1325. However, since packets circulate around the ring, this swap is not a problem, and does not introduce issues into either routing of the ring or performance of the ring.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A system comprising:
   a processor;
   a processor bus coupled to the processor;
   a data chip coupled to the processor bus; and
   an address chip coupled to the processor bus and coupled to the data chip, the address chip including a configuration ring, the configuration ring having a master, a first target and a second target, the master coupled through a ring to the first target, the first target coupled through the ring to the second target, the second target coupled through the ring to the master, wherein the master originates a plurality of packets containing configuration information and passes the plurality of packets to the first and second targets via the ring to configure the first and second targets.

2. The system of claim 1, further comprising:
   a graphics memory device;
   an accelerated graphics port; and
   a graphics expander bridge coupled to the graphics memory device and the accelerated graphics port, the graphics expander bridge comprising a plurality of functional blocks and a second ring by which the plurality of functional blocks are coupled to each other, the second ring and the plurality of functional blocks residing on a single integrated circuit chip, each of the plurality of functional blocks having a decoder and a plurality of configuration registers, wherein one of the plurality of functional blocks originates one or more packets containing configuration information and passes the one or more packets to one or more of the remaining functional blocks via the second ring to configure the one or more of the remaining function blocks.

3. The system of claim 2, wherein each of the plurality of functional blocks further comprises a ring interface to couple to the second ring.

4. The system of claim 2, wherein the second ring comprises a plurality of data lines to transmit the one or more packets.

5. The system of claim 1, wherein
   the first target comprises a first configuration block and
   the second target comprises a second configuration block.

6. The system of claim 1, wherein the configuration ring further comprises
   a second master coupled to the ring.

7. The system of claim 6, wherein the configuration ring further comprises
   an arbitrator, coupled to the master, and the second master, the arbitrator controlling activity of the master and the second master.

8. The system of claim 6, wherein the configuration ring further comprises
   a request line coupled to the master and the second master; and
   a grant line coupled to the master and the second master.

9. The system of claim 8, wherein
   the request line is configured to pass signals in a first direction and the grant line is configured to pass signals in a second direction.

10. The system claim 9, wherein
the first direction and the second direction are dynamically alterable.

11. The system of claim 6, wherein the configuration ring further comprises:
a request line coupled to the master, the second master, the first target, and the second target.

12. The system of claim 11, wherein
the request line is configured such that signals on the request line flow in a logically opposite direction to signals on the ring.

13. The system of claim 12, wherein
the ring comprises a grant line and a set of data lines, the grant line is configured to indicate the master may use the ring, the data lines are configured to transmit signals.

14. The system of claim 6, wherein
the second master comprises a buffer to store incoming data when the second master originates a packet, the incoming data is passed after the second master completes origination of the packet.

15. The system of claim 1, wherein
the ring comprises a set of data lines and the data lines are configured to transmit signals.

16. The system of claim 15, wherein
the master uses the ring to transmit signals to the first target, the first target uses the ring to transmit signals to the second target, and the second target uses the ring to transmit signals to the first master.

17. The system of claim 15, wherein
the master comprises a ring interface coupled to the ring and a control coupled to the ring interface, the control suitable for generating packets, the packets being transmitted through the ring interface to become signals on the ring.

18. The system of claim 17, wherein
the first target comprises a ring interface and a decoder coupled to the ring interface, the decoder receiving the signals that represent a packet, the decoder determining if the packet is addressed to the first target.

19. The system of claim 18, wherein
the second target comprises a ring interface and a decoder coupled to the ring interface, the decoder receiving the signals that represent a packet, the decoder determining if the packet is addressed to the second target.

20. The system of claim 19, wherein
the packet comprises a header and a set of data, the header including an indication of the logical size of the set of data.

21. The system of claim 19, wherein:
the packet comprised of a predetermined number of units of data, the units of data encoding an address.

* * * * *

UNITED STATES PATENT AND TRADEMARK OFFICE
CERTIFICATE OF CORRECTION

PATENT NO. : 6,820,158 B1
DATED : November 16, 2004
INVENTOR(S) : Lee et al.

It is certified that error appears in the above-identified patent and that said Letters Patent is hereby corrected as shown below:

Column 8,
Line 24, before "Valid", insert -- a --.
Line 42, delete "68" and insert -- 6B --.

Column 10,
Line 7, delete "98" and insert -- 9B --.

Signed and Sealed this

Fourteenth Day of June, 2005

JON W. DUDAS
*Director of the United States Patent and Trademark Office*